United States Patent [19]

Miyazawa

[11] Patent Number: 5,473,594
[45] Date of Patent: Dec. 5, 1995

[54] OPTICAL PICKUP DEVICE USING OPTICAL LENS COATED WITH ANTIREFLECTION FILM WHOSE SPECTRAL REFLECTANCE CHANGES IN ACCORDANCE WITH WAVELENGTH

[75] Inventor: Hiroshi Miyazawa, Tokorozawa, Japan

[73] Assignee: Kabushiki Kaisha Kenwood, Tokyo, Japan

[21] Appl. No.: 201,425

[22] Filed: Feb. 24, 1994

[30] Foreign Application Priority Data

Feb. 26, 1993 [JP] Japan .................. 5-038645

[51] Int. Cl.$^6$ ................................. G11B 7/135
[52] U.S. Cl. ............... 369/109; 369/107; 369/112; 369/283; 359/589; 359/583; 359/584
[58] Field of Search ................. 369/109, 283, 369/286, 112, 107; 359/580, 582, 586, 589, 583

[56] References Cited

U.S. PATENT DOCUMENTS

| | | | |
|---|---|---|---|
| 4,502,762 | 3/1985 | Anderson | 359/583 |
| 4,590,117 | 5/1986 | Taniguchi et al. | 359/586 |
| 5,140,457 | 8/1992 | Letter | 359/589 |
| 5,172,269 | 12/1992 | Ogura et al. | 359/580 |
| 5,178,955 | 1/1993 | Aharoni et al. | 359/580 |
| 5,245,468 | 9/1993 | Demiryont et al. | 359/389 |

FOREIGN PATENT DOCUMENTS 0223191  5/1987  European Pat. Off. .

Primary Examiner—Georgia Y. Epps
Assistant Examiner—Kim-Kwok Chu
Attorney, Agent, or Firm—Sixbey, Friedman, Leedom & Ferguson; Gerald J. Ferguson, Jr.; Eric J. Robinson

[57] ABSTRACT

An optical pickup device capable of maintaining a sufficient amount of laser beam light when recording information on an optical disc and stabilizing the light emission of the semiconductor laser when reproducing information. Each optical component constituting an optical system for an optical pickup device used for both information recording and reproducing is coated with an antireflection film whose spectral reflectance changes in accordance with the wavelength of an incident light. The antireflection film has a high spectral reflectance at a shorter wavelength in the whole range of light emission wavelength covered by the semiconductor laser light source and a low spectral reflectance at a longer wavelength, and is formed on the incident surface or outgoing surface of at least one optical transparent element. In recording information on an optical disc wherein a laser beam is emitted at a high output power and at a wavelength shifted to a longer peak wavelength, the transmission coefficient of a laser beam becomes high. Furthermore, in reproducing information wherein a laser beam is emitted at a low output power and at a wavelength shifted to a shorter peak wavelength, the transmission coefficient of a laser beam becomes low, reducing the amount of light returned to the semiconductor laser.

11 Claims, 3 Drawing Sheets

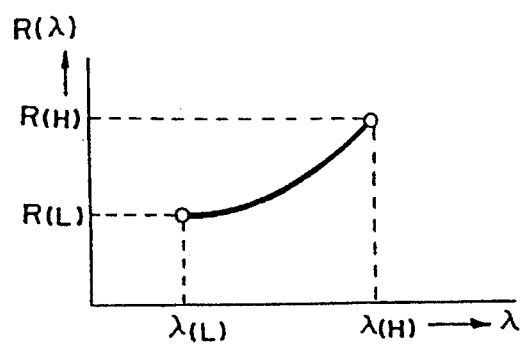
FIG. 6
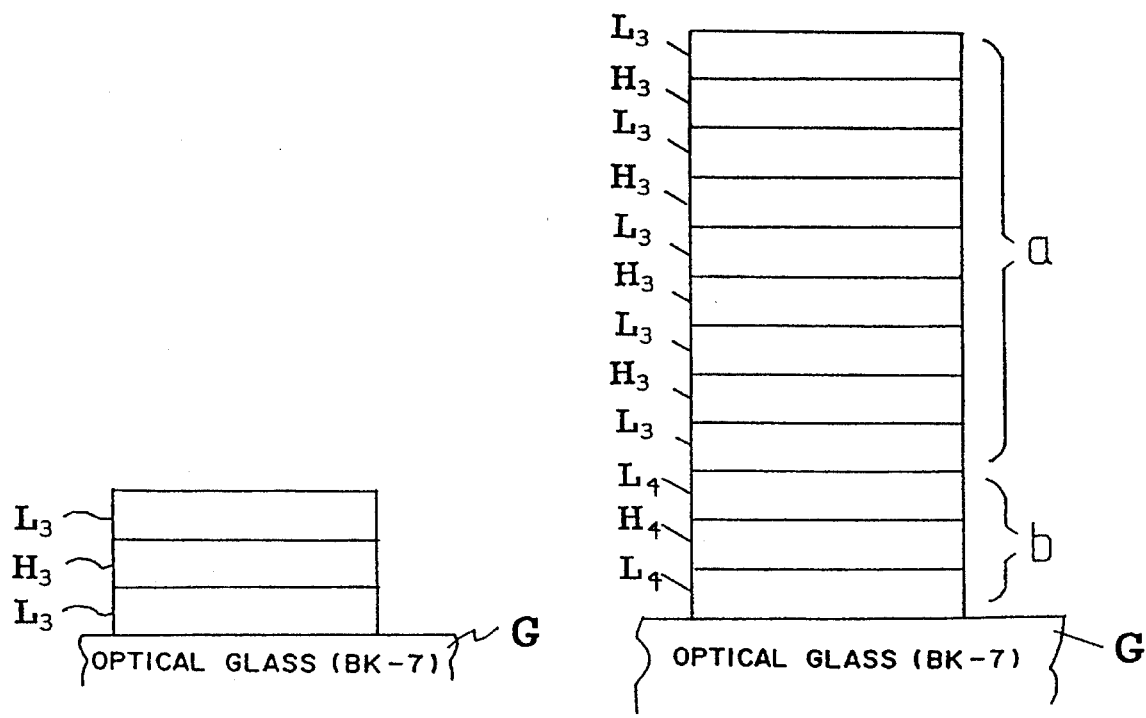
FIG. 7A
FIG. 7B

5,473,594

OPTICAL PICKUP DEVICE USING OPTICAL LENS COATED WITH ANTIREFLECTION FILM WHOSE SPECTRAL REFLECTANCE CHANGES IN ACCORDANCE WITH WAVELENGTH

BACKGROUND OF THE INVENTION

1. Field of the Invention

The present invention relates to an optical pickup device for an optical disc capable of information recording and reproducing, and more particularly to an optical pickup device suitable for stable light emission of a semiconductor laser in reproducing information recorded on an optical disc.

2. Related Background Art

FIG. 5 shows a total spectral reflectance characteristic of antireflection thin films used in an optical system of a conventional optical pickup device.

In an optical pickup device having a function of recording information on an optical disc and reproducing recorded information, an optical system providing an optical path for a laser beam includes, as shown in FIG. 3, a semiconductor laser 1 for emitting a laser beam, a collimator lens 2, a quarter wavelength plate 3, a diffraction grating 4, two beam shaping prisms 5, a beam splitter 6, a mirror 7, and an objective lens 8 disposed in this order. A laser beam passed through this optical system is applied to an optical disc 8 in the form of a laser beam spot.

In an optical pickup device dedicated to only information reproduction, an optical system providing an optical path for a laser beam includes, as shown in FIG. 4, a semiconductor laser 1, a collimator lens 2, a diffraction grating 4, a beam splitter 6, a mirror 7, and an objective lens 8 disposed in this order. A laser beam passed through this optical system is applied to an optical disc 8 in the form of a laser beam spot.

As compared with the optical system for an optical pickup device dedicated only to information reproduction, because the optical system for both information recording and reproducing requires a higher output power when recording information than when reproducing information, the structure of this optical system becomes more complicate in order to effectively use the light emission amount of the semiconductor laser 1.

In order to efficiently guide a laser beam to the optical disc 9 when recording information, antireflection thin films have been generally formed at laser beam transmission surfaces of each optical component of the optical pickup device for both information recording and reproducing. That is to say, the antireflection thin films are formed at transmission surfaces of the collimator lens 2, quarter wavelength plate 3, diffraction grating 4, two beam shaping prisms 5, beam splitter 6, mirror 7, and lens 8.

As shown in FIG. 5, the spectral reflectance characteristic of antireflection thin films used in a conventional optical system has generally a flat distribution of reflectances R in the range of light emission wavelengths covered by the semiconductor laser 1 from the peak wavelength λ (L) at a low output power to the peak wavelength λ (H) at a high output power.

In order for a photodetector (not shown) to stably detect a light beam reproduced by birefringence at the optical disc, films having substantially the equal transmission and reflectance characteristics both for P and S polarizations have been formed on surfaces of the beam splitter 6. In this way, a constant amount of light is reflected to the photodetector without being affected by the polarization characteristic of a light beam reflected from the optical disc 9.

With the conventional optical pickup device, however, the reflectance of a beam splitter has been unable to set too high, because the transmission of a laser beam to an optical disc required low reflectance in order to obtain a large amount of laser beam light when recording information.

Since the laser beam transmission is maintained at a sufficiently high level, light reflected from the optical disc passes more through the beam splitter and returns to the light emission surface of the semiconductor laser. Therefore, light emission at the semiconductor laser operating at a low output power when reproducing information may fluctuate.

SUMMARY OF THE INVENTION

It is an object of the present invention to solve the above-described conventional problems and provide an optical pickup device capable of maintaining a sufficient amount of laser beam light when recording information on an optical disc and stabilizing the light emission of the semiconductor laser when reproducing information.

According to one aspect of the present invention, there is provided an optical pickup device which includes:

an optical system for guiding a laser beam emitted from a semiconductor laser light source onto an information recording surface of an optical disc in the form of a laser beam spot; and an optical system for guiding a laser beam reflected from the information recording surface to a photodetector, the laser beam being emitted from the semiconductor laser light source at a high output power when recording information and at a low output power when reproducing information, wherein each optical component constituting the optical system for guiding the laser beam onto the information recording surface is formed with an antireflection film whose spectral reflectance changes in accordance with a wavelength of incident light.

According to the present invention, each optical component constituting an optical system for an optical pickup device is formed with an antireflection film whose spectral reflectance changes in accordance with a wavelength of incident light (preferably, the antireflection film has a low spectral reflectance at a shorter wavelength in the whole range of light emission wavelengths covered by the semiconductor laser light source and a high spectral reflectance at a longer wavelength). As a result, in reproducing information from an optical disc at a low output power of the semiconductor laser, an optical transmissivity at the peak wavelength λ (L) becomes minimum. And the amount of light returned to the emission surface of the semiconductor laser becomes minimum.

Furthermore, in recording information on the optical disc at a high output power of the semiconductor laser shifted from a shorter wavelength to a longer wavelength, an optical transmissivity at the peak wavelength λ (H) becomes maximum and the amount of light emitted from the semiconductor laser and transmitted via the optical system to the optical disc becomes maximum.

BRIEF DESCRIPTION OF THE DRAWINGS

FIG. 6 is a graph showing the other spectral reflectance characteristics of antireflection thin films used in an optical system according to the present invention.

FIG. 7A is a schematic diagram in section showing one structure of an antireflection thin film according to the present invention, which has the spectral reflectance characteristics as shown in FIG. 6.

FIG. 7B is a schematic diagram in section showing the other structure of an antireflection thin film according to the present invention, which has the spectral reflectance characteristics as shown in FIG. 6.

DETAILED DESCRIPTION OF THE PREFERRED EMBODIMENTS

Figure 1:
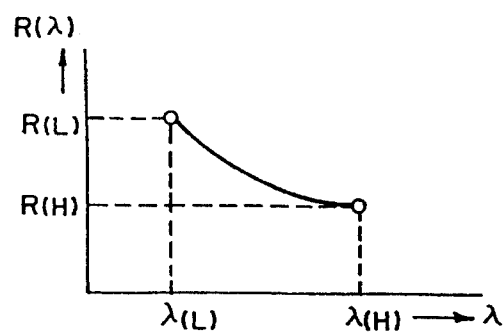
FIG. 1 is a graph showing one spectral reflectance characteristics of antireflection thin films used in an optical system according to the present invention.

An embodiment of an optical pickup device according to the invention will be described with reference to FIGS. 1 and 2. Like elements to those conventional elements are represented by identical reference numerals and symbols, and the description thereof is omitted.

Figures 2A, 2B:
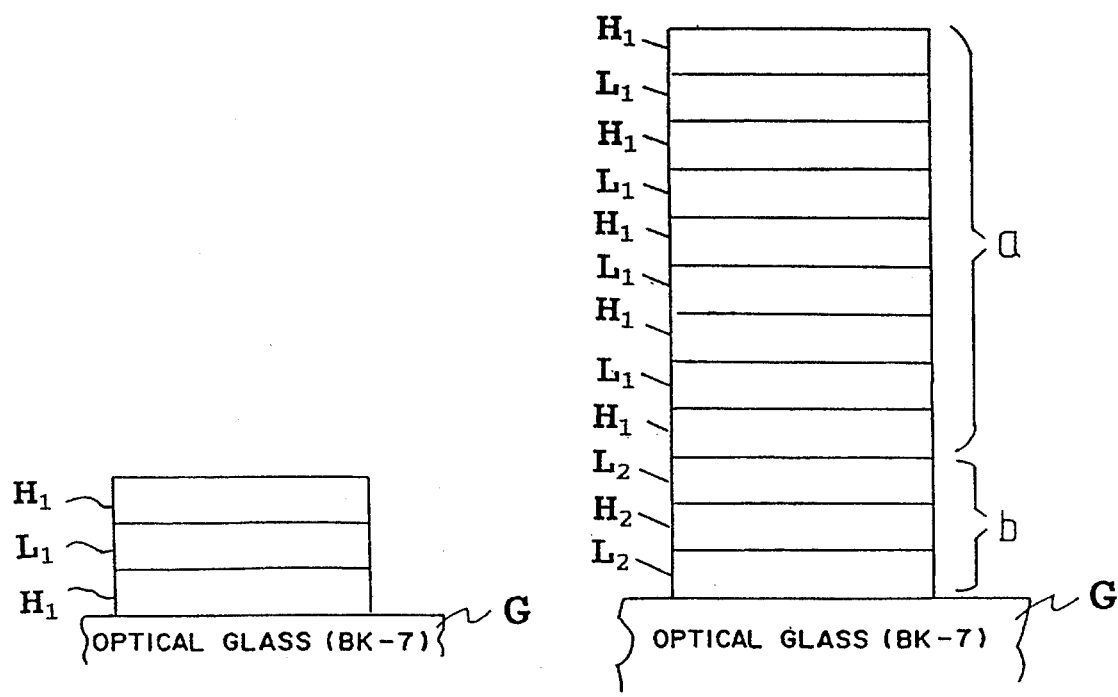
FIG. 2A is a schematic diagram in section showing one structure of an antireflection thin film according to the present invention, which has the spectral reflectance characteristics as shown in FIG. 1.
FIG. 2B is a schematic diagram in section the other structure of an antireflection thin film according to the present invention, which has the spectral reflectance characteristics as shown in FIG. 1.
Figure 3:
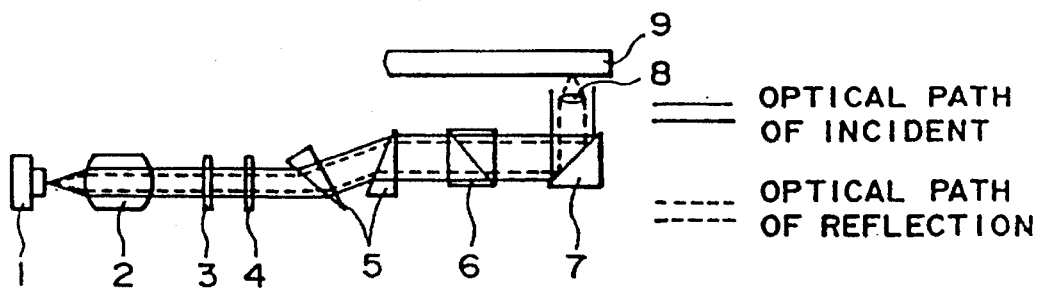
FIG. 3 is a schematic diagram showing the structure and optical paths of a prior art optical system for an optical pickup device for both information recording and reproducing.
Figure 4:
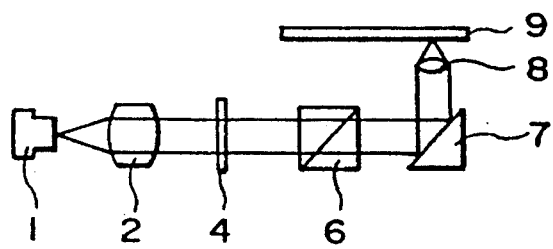
FIG. 4 is a schematic diagram showing the structure and optical paths of a prior art optical system for an optical pickup device dedicated only to information reproduction.
Figure 5:
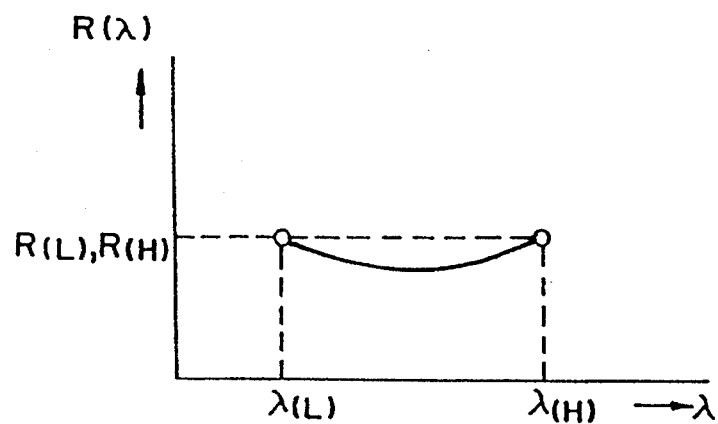
FIG. 5 is a graph showing the spectral reflectance characteristic of antireflection thin films used in a conventional optical system.

FIG. 1 is a graph showing the spectral reflectance characteristic of antireflection thin films used in an optical system according to an embodiment of the present invention, FIG. 2 is a schematic diagram in section showing an antireflection thin film according to an embodiment of the present invention, and FIG. 3 is a schematic diagram showing the structure and optical paths of a general optical system for an optical pickup device for both information recording and reproducing.

Referring to FIG. 1, $\lambda$ represents a wavelength of a laser beam, $\lambda$ (L) represents a peak wavelength when a laser beam having a short wavelength is emitted at a low output power, and $\lambda$ (H) represents a peak wavelength when a laser beam having a long wavelength is emitted at a high output power. $R(\lambda)$ represents a reflectance of an antireflection thin film, $R$ (L) represents a reflectance of the antireflection thin film at the peak wavelength $\lambda$ (L), and $R$ (H) represents a reflectance of the antireflection thin film at the peak wavelength $\lambda$ (H).

FIGS. 2A and 2B are schematic diagrams showing the structures of antireflection thin films which have the spectral reflectance characteristics as shown in FIG. 1. In FIGS. 2A and 2B, "G" refers to a glass substrate, "H" and "L" refer to thin films which are laminated on the glass substrate where the "H" denotes a layer of the material (for example, ZnS) having a refractive index more than the glass and the "L" denotes a layer of the material (for example, $MgF_2$) having a refractive index less than the glass. And also, the "$H_1$", "$H_2$" and "$H_3$" represent the layers which are same in material but different in thickness from one another.

In the optical system for an optical pickup device for both information recording and reproducing as shown in FIG. 3, a laser beam emitted from a semiconductor laser beam 1 is transformed into a parallel laser beam by the collimator lens 2, and into a circularly polarized beam by the quarter wavelength plate 3. The diffraction grating 4 generates a plurality of laser beams each separated by a small angle. These laser beams are shaped by the two beam shaping prisms 5. A predetermined amount of the laser beam passed through the beam shaping prisms 5 is then applied via the beam splitter 6 to the mirror 7. The laser beam reflected by the mirror 7 is incident to the objective lens 8 and applied to the information recording surface of the optical disc 9 in the form of a laser beam spot.

A laser beam (indicated by broken lines in FIG. 3) reflected from the information recording surface of the optical disc 9 is passed through the objective lens 8, reflected by the mirror 7, and applied to the beam splitter 6.

A predetermined amount of the laser beam is reflected upward and transmitted to a photodetector (not shown), and part of the laser beam passes through the beam splitter 6 and is returned to the emission surface of the semiconductor laser 1.

According to a preferable embodiment of the present invention, antireflection thin films are formed at each optical component constituting the optical system shown in FIG. 3 for an optical pickup device for both information recording and reproducing, including the collimator lens 2, quarter wavelength plate 3, diffraction grating 4, two beam shaping prisms 5, beam splitter 6, mirror 7, and objective lens 8. The antireflection thin film has a spectral reflectance characteristic shown in FIG. 1 providing a low reflectance R (H) at a longer peak wavelength $\lambda$ (H) in the range of laser emission wavelengths covered by the semiconductor laser and a high reflectance R (L) at a shorter peak wavelength $\lambda$ (L).

The antireflection thin film may be formed by a single layer of low refractive index material (for example, $MgF_2$) or laminated layer films having different reflectances as shown in FIGS. 2A and 2B.

FIG. 2A shows a basic laminated structure of the antireflection film which has the spectral reflectance characteristics as shown in FIG. 1. This antireflection film is made of three laminated layers using two different dielectric materials.

That is, on the glass substrate G (refractive index: 1.52), the layer $H_1$ (refractive index: 2.3) whose refractive index is more than the glass, the layer $L_1$ (refractive index: 1.38) whose refractive index is less than the glass, and the layer $H_1$ are laminated in this order.

Next, FIG. 2B is a schematic diagram showing a further preferable embodiment and it shows a laminated structure of multi-layered dielectric films. This multi-layered dielectric films are roughly divided into the section a (which causes the spectral reflectance to be changed depending on a wavelength of incident light) and the section b for preventing reflection. By coating the thin film having the laminated structure as shown in FIGS. 2A or 2B on the either one of the optical planes (through which a laser light passes) of the optical element (e.g. collimator lens 2, quarter wavelength plate 3, diffraction grating 4, or beam shaping prisms 5) in the optical system shown in FIG. 3, the spectral reflectance characteristics as shown in FIG. 1 are realized and the desired objective of the present invention is attained.

When a laser beam is emitted from the semiconductor laser 1 at a high output power as in the case of recording information, the wavelength (λ) of the emitted beam shifts to a longer peak wavelength λ (H) in the whole range of laser emission wavelengths covered by the semiconductor laser 1. In this case, the reflectance R (λ) lowers to a lower reflectance R (H).

As a result, a laser beam emitted from the semiconductor laser 1 for information recording can pass through the optical system shown in FIG. 3 at a high transmission coefficient, efficiently supplying an amount of light energy necessary for recording information on the information recording surface of the optical disc 9.

A laser beam is emitted at a low output power when reproducing information, and the wavelength of the emitted beam shifts to a predetermined wavelength near a shorter peak wavelength λ (L). In this case, as shown in FIG. 1, the reflectance R (λ) becomes high near at a reflectance R (L).

As a result, the amount of light at the information recording surface of the optical disc 9 becomes sufficient for information reproduction. The output power of the semiconductor laser can be maintained high without lowering it greatly, and the amount of the laser beam reflected from the optical disc 9 and returned to the semiconductor laser can be made very small.

In the above, a technique for attaining the desired objective of the present invention was explained. That is, it is possible to decrease the light returned to the semiconductor laser when reproducing by forming on the glass surface of at least one optical transparent element (e.g. collimator lens 2, quarter wavelength plate 3, diffraction grating 4, two beam shaping prisms 5) the antireflection film which has a high spectral reflectance at shorter wavelength in the range of light emission wavelengths covered by said semiconductor layer light source and a low spectral reflectance at a longer wavelength.

However, it is also possible to attain the desired objective of the present invention by using a technique other than the above technique. That is, the desired objective of the present invention "decreasing the light returned to the emission surface of semiconductor laser when reproducing" may be attained by forming on the reflection surface of the optical reflection element 7 the antireflection film which has a low spectral reflectance at a shorter wavelength in the range of light emission wavelengths covered by said semiconductor laser light source and a high spectral reflectance at a longer wavelength, as shown in FIG. 6.

And, the spectral reflectance characteristics as shown in FIG. 6 may be realized by using the antireflection film which has the laminated structure as shown in FIGS. 7A or 7B.

According to an optical pickup device of this invention, each optical component constituting an optical system for an optical pickup device used for both information recording and reproducing is formed with an antireflection film whose spectral reflectance changes in accordance with a wavelength of incident light, (i) in one embodiment, the antireflection film, which has a low spectral reflectance at a high output power emission wavelength λ (H) when recording information and a high spectral reflectance at a low output power emission wavelength λ (L), is formed on the surface of at least one optical transparent element, (ii) in the other embodiment, the antireflection film, which has a high spectral reflectance at a high output power emission wavelength λ (H) when recording information and a low spectral reflectance at a low output power emission wavelength λ (L), is formed on the reflection surface of an optical reflection element.

As a result, in an optical pickup device for both information recording and reproducing which has a larger number of optical components than an optical pickup device dedicated only to information reproduction, the laser beam transmission coefficient of the optical system becomes high when recording information at a high output power of a semiconductor laser. It is therefore possible to obtain a light amount sufficient for stable information recording on the information recording surface of an optical disc.

Furthermore, when reproducing information at a low output power of a semiconductor laser, the reflectance of the whole optical system becomes high and the transmission efficiency becomes low, thereby considerably reducing the amount of light returned to the emission surface of the semiconductor laser, and eliminating light emission fluctuation specific to a low output power emission to thus obtain a reproduced signal of high stability and fidelity.

What is claimed is:

1. An optical pickup device comprising:
    a semiconductor laser light source emitting a laser beam at a high output power when recording information and at a low output power when reproducing information; and
    an optical system for directing said laser beam to an information recording surface of an optical disc and for directing said laser beam reflected from said information recording surface to a photodetector,
    wherein each optical component of said optical system is coated with an antireflection film whose spectral reflectance varies between a first level at one end of an operating wavelength range and a second level at the other end of said operating wavelength range, said second level being lower than said first level, whereby the amount of light returned to said semiconductor laser is reduced when reproducing information from said optical disc.

2. An optical device comprising:
    optical means comprising at least one optical element for directing a laser beam emitted from a laser light source onto an information recording surface of an optical disc;
    wherein said at least one optical element is coated with an antireflection film whose spectral reflectance varies between a first level at one end of an operating wavelength range and a second level at the other end of said operating wavelength range, said second level being lower than said first level.

3. The device of claim 2 wherein said first level occurs at a longer wavelength in said operating wavelength range and said second level occurs at a shorter wavelength in said operating wavelength range.

4. The device of claim 3 wherein said at least one optical element is a reflective element that reflects said laser beam.

5. The device of claim 4 wherein said reflective element is a mirror.

6. The device of claim 4 wherein said optical means further operates to direct a laser beam reflected from the information recording surface to a photodetector.

7. The device of claim 6 wherein said laser beam emitted from said laser light source is emitted at a high output power when recording information to said optical disk and at a low output power when reproducing information from said optical disk.

8. The device of claim 4 wherein said first level occurs at a shorter wavelength in said operating wavelength range and said second level occurs at a longer wavelength in said operating wavelength range.

9. The device of claim 8 wherein said at least one optical element is a transparent element through which said laser beam is transmitted.

10. The device of claim 9 wherein said transparent element is one of a collimator lens, quarter wavelength plate, diffraction grating, and beam shaping prism.

11. The device of claim 2 wherein said antireflection film is coated on one of the incident surface and the outgoing surface of said at least one optical element through which said laser beam is transmitted.

* * * * *